Doane & Burr,
Barrel Stand,
Nº 58,787. Patented Oct. 16, 1866.
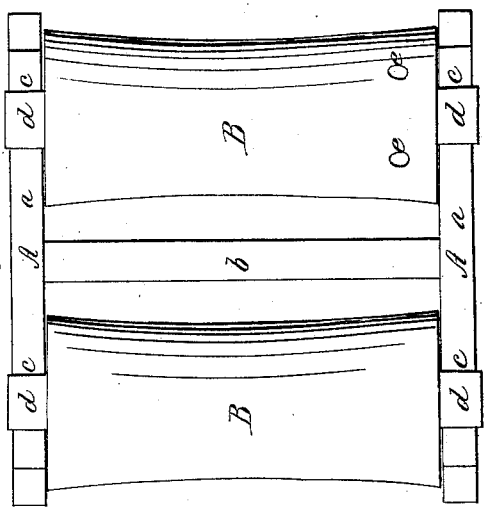
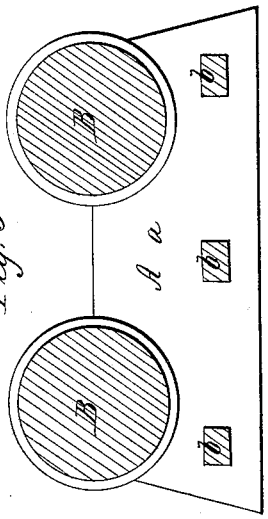
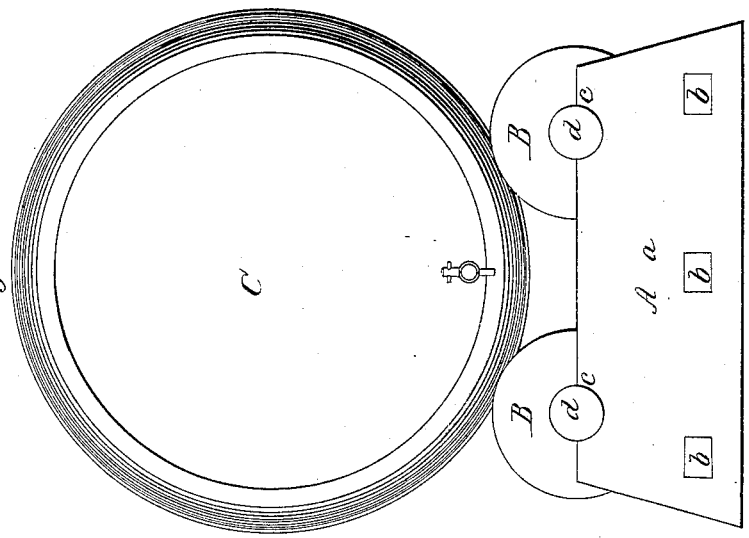
Witnesses
Samuel N. Piper
George Andrews
Inventors
W. W. Doane & W. P. Burr
by their attorney
R. H. Eddy

UNITED STATES PATENT OFFICE.

W. W. DOANE AND W. P. BURR, OF BREWER, MAINE.

IMPROVEMENT IN SKIDS FOR SUPPORTING BARRELS.

Specification forming part of Letters Patent No. 58,787, dated October 16, 1866.

*To all whom it may concern:*

Be it known that we, WILLIAM W. DOANE and WILLIAM P. BURR, of Brewer, in the county of Penobscot and State of Maine, have made a new and useful invention having reference to Skids for Supporting Barrels or Hogsheads; and do hereby declare the same to be fully described in the following specification, and represented in the accompanying drawings, of which—

Figure 1 is a front-end elevation of a hogshead supported on the rollers of our improved skid. Fig. 2 is a top view; and Fig. 3, a longitudinal section of the rollers and skid.

In stores or vaults for the preservation of liquors it often becomes desirable to revolve a barrel or turn a hogshead after its deposit on its skids or supporting-timbers, the object of such a movement being to bring the bunghole uppermost or into some other position. This movement is usually attended with more or less difficulty. The hogshead or tun is usually rolled on the skid without regard to the position of the bung-hole, which, after the hogshead may have attained its place, has to be adjusted so as to be at the upper part thereof. The accomplishment of this adjustment in the ordinary way, heretofore practiced, frequently requires the expenditure of much labor.

The object of our improvement is to enable the hogshead to be easily revolved for the purpose specified.

In carrying out our invention, we combine with the skids two rollers for supporting the hogshead.

In the drawings, A A are the skids, which are two timbers, *a a*, united by cross-ties *b b b*, and arranged parallel to each other. In the upper edges of each of the said timbers we form semicircular bearings *c c* for receiving the journals *d d* of two rollers, B B, arranged between the skids, and with their axes parallel, as represented. One or each of these rollers may have a series of holes, *e e e*, made in it radially and near one end of it, they being to enable a person to insert a lever or bar in the roller for the purpose of revolving it, in order to cause the hogshead or barrel C, while resting on the two rollers, to revolve on and be revolved by one of them, viz., that moved by the lever. When, however, the hogshead may have been deposited on the rollers, it may be after easily revolved by the hands of a person applied to it. The rollers should be curved on their peripheries, as shown in the drawings—that is, so as to fit to the hogshead lengthwise, in order that it may rest with proper steadiness on them.

What we claim as our invention, for the purposes hereinbefore set forth, is—

The improved hogshead-supporter, or combination and arrangement of rollers and skids, made and applied substantially as specified.

WILLIAM W. DOANE.
WILLIAM P. BURR.

Witnesses:
A. WOOD,
JOSEPH W. WISWELL.